Oct. 3, 1944. H. KLEMPERER 2,359,315

CONDENSER SEAM WELDING

Filed Feb. 20, 1940

INVENTOR.
HANS KLEMPERER,
BY Elmer J. Gorn
ATTY.

Patented Oct. 3, 1944

2,359,315

UNITED STATES PATENT OFFICE 2,359,315

CONDENSER SEAM WELDING

Hans Klemperer, Belmont, Mass., assignor to Raytheon Manufacturing Company, Newton, Mass., a corporation of Massachusetts Application February 20, 1940, Serial No. 319,919

12 Claims. (Cl. 219—4)

The present invention relates to seam welding machines and systems of the resistance welding type.

An object of this invention is to increase the speed at which welding of this type may be carried out.

Another object is to utilize energy stored in condenser means for each of the successive welding impulses for the welding operations of such a machine.

Another object is to devise such an arrangement which operates with reliability and high efficiency.

A further object is to devise a seam welding system in which the welding operations are automatically synchronized with the angular position of the welding wheel electrodes.

A still further object is to cause the shape of the current wave in each welding impulse to be independent of the welding speed.

The foregoing and other objects of this invention will be best understood from the following description of exemplifications thereof, reference being had to the accompanying drawing, wherein.

Figure 1:
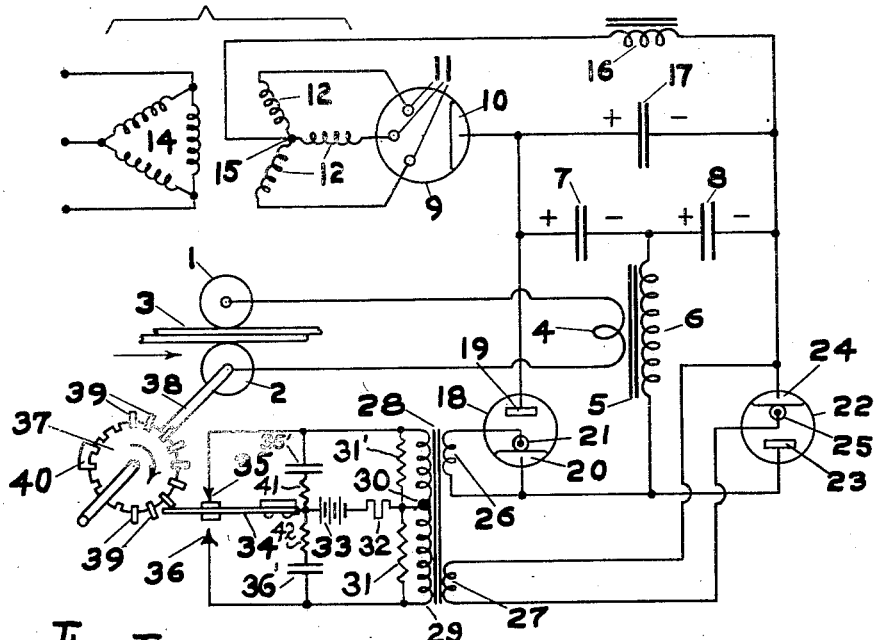
Fig. 1 is a diagram of a seam welding system embodying my invention.

In Fig. 1 welding current is to be supplied to a pair of rotatable welding electrodes or wheels adapted to roll on the work 3 which is to be welded. The current is to be supplied to the electrodes 1 and 2 in successive pulses of welding current so as to perform successive welding operations for predetermined angular positions of these electrodes. Each welding operation welds a spot on the work 3. These spots preferably overlap so as to form a continuous seam weld. The welding current is supplied to the electrodes 1 and 2 from a secondary winding 4 of a welding transformer 5 having a primary winding 6. The primary winding is adapted to be supplied with successive welding current impulses from a pair of condensers 7 and 8. These condensers are adapted to be charged from a suitable source of direct current, such as a battery, generator, rectifier, or the like. The direct current with which the condensers 7 and 8 are charged is preferably quite smooth and steady, and can conveniently be supplied from the arrangement as shown in Fig. 1. This arrangement comprises a rectifier tube 9 having a cathode 10 of the permanently-energized type. This cathode may conveniently be a pool of mercury from which an arc may be started and maintained in any well-known manner. The rectifier tube 9 is provided with a plurality of anodes 11, each of which is connected to the outer end of one of a plurality of phase windings 12. These phases windings constitute the secondary of a charging transformer 13 provided with a plural-phase primary winding 14 which is adapted to be connected to a suitable source of plural-phase alternating current. The secondary windings 12 are provided with a center tap 15 which is connected through a current stabilizing and limiting inductance 16 to the negative side of condenser 8. The cathode 10 is connected to the positive side of condenser 7. The condensers 7 and 8 are connected in series, and a third condenser 17 is connected across them. The condenser 17 is large enough to maintain substantially a constant voltage across the condensers 7 and 8 during operation. The condenser 7 is adapted to be discharged through the primary winding 6, and for this purpose one end of said primary winding is connected to the negative side of the condenser 7. The positive side of said condenser is connected through a controlled ignition discharge tube 18 to the other side of said primary winding. The tube 18 is preferably of the pool cathode type provided with an igniter for initiating a cathode spot on the pool in order to cause the tube to conduct current. The tube 18 is provided with an anode 19 connected to the positive side of condenser 7 and with a pool cathode 20, preferably of mercury, connected to the lower end of the primary winding 6. The tube 18 is also provided with an igniter 21. Although this igniter may be of any suitable type, it preferably is of the electrostatic type consisting of a conductor separated and insulated from the cathode by a thin glass layer. This igniter is of the type which initiates an arc spot on the cathode 20 only if a relatively high voltage is supplied to said igniter of such a polarity as to make said igniter positive with respect to this cathode 20. The condenser 8 likewise is adapted to be discharged through the primary winding 6. For this purpose the negative side of condenser 8 is connected to the lower end of the primary winding 6 through a controlled ignition discharge tube 22, preferably of the same type as tube 18. Tube 22 is provided with an anode 23 connected to the lower end of the primary winding 6, and with a pool cathode 24 connected to the negative side of the condenser 8. The cathode 24 is associated with an igniter 25, preferably of the same type as igniter 21. Igniters 21 and 25 are adapted to be supplied alternately with igniting impulses from the secondary windings 26 and 27 of an igniting transformer 28. This igniting transformer is provided with a primary winding 29. The primary winding 29 is provided with a center tap 30 which is connected through a resistance 32, and a suitable source of current, such as a battery 33, to an armature 34. The outer ends of the primary winding are connected respectively to contacts 35 and 36 adapted to be alternately engaged by the armature 34. The armature 34 is arranged so as to be shifted from one position of contact to another by a contact wheel 37 driven in synchronism with one of the welding wheels 2. This synchronized drive may be accomplished in any suitable manner as by having the contact wheel 37 mounted on the same shaft 38 as the welding wheel 2. The armature 34 may be made of spring material which in the normal position is in engagement with the contact 35. Said armature is moved successively into engagement with the contact 36 by cam projections 39 mounted on the periphery of the contact wheel 37. The wheel 37 is adapted to be provided with a plurality of such cam projections, and these projections are preferably individually removable from the wheel 37. Also these cam projections may be of any desired length. For example, a cam projection 40 is shown on the wheel 37 which keeps the armature 34 from returning to the contact 35 for a longer period after engaging the contact 36. Due to this arrangement the number of successive reciprocations of the armature 34 and the time intervals between each individual alternation can be readily adjusted and predetermined. In order to prevent excessive sparking at the contacts 35 and 36, condensers 35' and 36', in series with resistances 41 and 42, are connected between the armature 34 and the contacts 35 and 36, respectively. In order to avoid undesirable voltage surges in the primary winding 29, resistances 31 and 31' are connected across the two halves of said primary winding, respectively.

Figure 2:
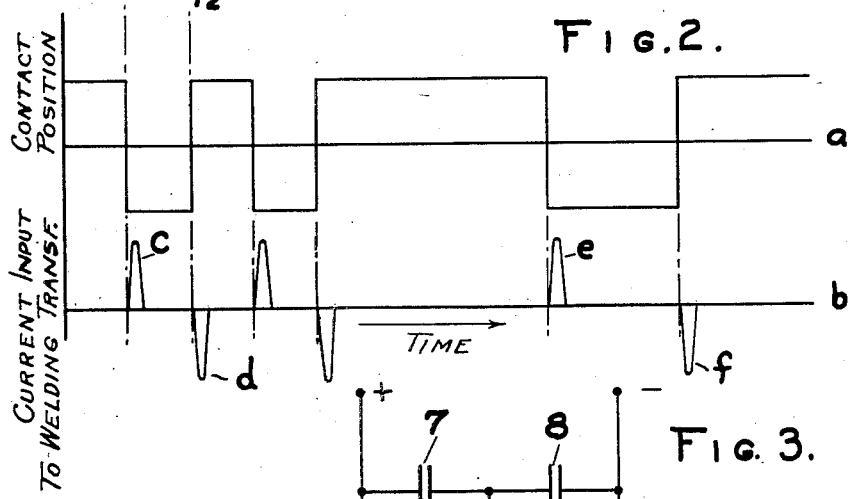
Fig. 2 is a set of curves illustrating the mode of operation of my invention.

The operation of the system described above may be understood more clearly in connection with the curve shown in Fig. 2. On axis $a$ is illustrated the position of the armature 34. The line above axis $a$ represents the position of said armature in engagement with the contact 35, while the line below said axis illustrates the position of said armature in engagement with contact 36. The current pulsations supplied to the primary winding 6 are represented along axis $b$.

When the system is energized, the rectifier tube 9 supplies the condensers 7 and 8 with direct current through the inductance 16, whereby said condensers are charged to a predetermined voltage. The condenser 17 is also charged to the total voltage across the condensers 7 and 8, and as explained above tends to maintain this voltage at a constant value. Due to the provision of a plurality of rectifying phases in the tube 9, the output therefrom consists of a relatively constant direct current with a superimposed slight ripple. The inductance 16 and the condenser 17 form a filter which removes the ripple from the voltage supplied to the condensers 7 and 8. The work 3 is then fed between the welding electrodes 1 and 2, and moves in the direction as indicated by the arrow. The wheels 1 and 2 rotate and the contact wheel 37 rotates in synchronism therewith.

At the time $T_1$, as shown in Fig. 2, one of the cam projections 39 moves the armature 34 from contact 35 to contact 36. This breaks the flow of current in the primary winding 29, resulting in a voltage impulse being supplied to the igniter 21. However, the winding 26 is of such polarity that this voltage pulse is in such a direction as to make the igniter 21 negative with respect to its associated cathode 20, and therefore the tube 18 does not fire. When the armature 34 engages the contact 36, it supplies a pulse of current from the battery 33 to the primary winding 29. This pulse of current is in such a direction as to make the igniter 25 positive with respect to its associated cathode 24, and thus the igniter 25 fires the tube 22. Thereupon the condenser 8 discharges through the tube 22 into the primary winding 6 so as to deliver a pulse of current $c$ thereto. This produces a corresponding pulse of current in the secondary winding 4 which supplied to the electrodes 1 and 2 causes a spot to be welded on the work 3. The constants of the condenser 8 and the load circuit, including the transformer 5 connected thereto, are such that the pulse of current $c$ tends to reverse in the short interval shown in Fig. 2. Due to the rectifying action of tube 22, reverse current cannot pass, and therefore the discharge in tube 22 is extinguished. During the pulse of current $c$, the voltage across the condenser 8 falls to zero and then reverses. The reversed polarity on said condenser represents a return of energy thereto, which energy was stored in the load circuit, including the transformer 5 at the peak of the current pulsation $c$. During the pulse of current $c$, the total voltage across the condensers 7 and 8 tends to remain constant due in part to the presence of the large condenser 17. Thus at the end of said current pulsation, the voltage on the condenser 7 has been built up to the full voltage of the condenser 17 plus the reversed charge on the condenser 8. As a matter of fact, a substantial part of the current flowing in the current impulse $c$ represents additional charging current flowing through the tube 22 and primary winding 6 to the condenser 7 to effect the change in voltage thereon mentioned above.

At the time $T_2$, the armature 34 drops from the cam projection 39 with which it was engaged, and returns to contact 35. This breaks the current flow in the primary winding 31, giving another voltage impulse to the igniter 25. This, however, is in a direction to make said igniter negative with respect to its associated cathode 24, and thus the tube 22 does not tend to fire. Even if such a tendency existed, the reversed voltage on the condenser 8 is in a direction to oppose flow of current through the tube 22. This combination of conditions insures against any undesired igniting of the tube 22. When the armature 34 engages the contact 35, it supplies a pulse of current from the battery 33 to the primary winding 29. This creates a voltage impulse in the secondary winding 26, tending to make the igniter 21 positive with respect to its associated cathode 20. This initiates an arc spot on said cathode, and thus the tube 18 fires. Thereupon the condenser 7 discharges through the tube 18 into the primary winding 6 and supplies a pulse of current $d$ thereto. This pulse of current likewise produces a corresponding current in the secondary winding 4, which when supplied to the electrodes 1 and 2 welds another spot on the work 3. The constants of the condenser 7 and the load circuit, including the transformer 5, are such that the pulse of current d tends to reverse in the short time shown, whereupon the tube 18 is extinguished. During the pulse of current d, the action of the system is the same as that described for current pulse c, except that the voltage on the condenser 7 reverses and the condenser 8 loses its reversed charge and builds up voltage in the proper direction. This is accomplished to a substantial degree by current flowing through the tube 18 and primary winding 6 in a manner similar to that described for condenser 7. Thus it will be seen that condensers 7 and 8 are charged alternately through primary winding 6 and tubes 22 and 18, respectively. As pointed out above, the energy stored in the load circuit at the peaks of the current pulsations is restored to the condensers 7 and 8, respectively. This energy, therefore, is not wasted inasmuch as it is merely transferred through the condensers 7 and 8 alternately so as to be available as energy for succeeding welding operations.

The above action is repeated as each cam projection 39 passes by the armature 34. Each current pulse produces a welded spot on the work 3. As in the usual seam welding, these spots preferably overlap to form a continuous seam weld. Since the contact wheel 37 and the welding electrode 2 are rotated synchronously, the welded spots are automatically synchronized with the rotation of the welding wheel 2. Thus these spots occur at definite angular positions of said welding wheel. The constants of the discharge circuits of condensers 7 and 8 are preferably such that the current pulses supplied to the primary winding 6 are of shorter duration than that determined by successive welded spots at the maximum desired welding speed.

By removing the cam projections 39 from any desired portion of the periphery of the contact wheel 37, welding spots are omitted from a corresponding portion of the circumference of the welding wheel 2. Also the angular spacing of the spots along the welding wheel 2 can be adjusted by selecting any desired length and spacing of the cam projections on the wheel 37. For example, if the cam projection 40 of substantially greater length than each cam projection 39 is provided, a corresponding increase of the time between two successive current pulses e and f, as shown in Fig. 2, results. It will be seen that by proper selection and disposition of the cam projections, any desired pattern of successive welding spots can be obtained.

Figure 3:
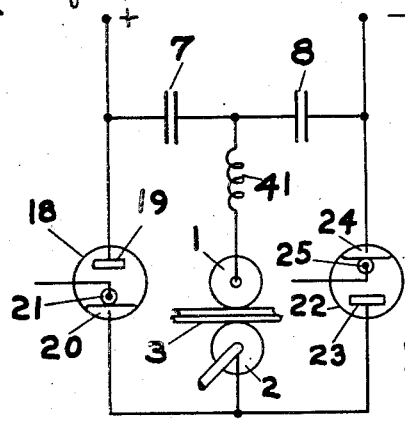
Fig. 3 is a fragmentary diagram of a modification of the system illustrated in Fig. 1.

At high welding speeds, the desired circuit constants may result in relatively few primary winding turns 6, so that under these conditions the transformer 5 may be eliminated as shown in Fig. 3. In this figure the same reference numerals are applied where elements are identical with those shown in Fig. 1. Of course it is to be understood that the rest of the system illustrated in Fig. 1 is to be used in association with the arrangement shown in Fig. 3. In Fig. 3, instead of feeding the current impulses into a primary winding, such impulses are fed directly to the welding contact wheels 1 and 2. In order to secure the proper period of discharge for the condensers 7 and 8, an inductance 41 of the proper value is connected in series with the electrodes 1 and 2. The operation of the system shown in Fig. 3 is substantially identical with that described in connection with Fig. 1.

Welding systems constructed in accordance with my invention are particularly adapted for rapid succession of welding spots. In many instances it is desirable to produce such welding spots at a rate greater than that which would be available from each half cycle of commercial sixty-cycle alternating current. By providing a filtered rectifying system as illustrated herein, the limitations of speed of welding are not controlled by the frequency of the alternating current, but only by the physical limitations of the welding system itself. In cases where the speed of welding is less than that determined by the frequency of a commercial alternating current system, the alternating current need not be rectified in some installations.

Of course it is to be understood that this invention is not limited to the particular details as described above as many equivalents will suggest themselves to those skilled in the art. For example, either condenser 7 or 8 may be omitted, resulting in reduction of power. Also other dispositions of the condenser means 7 and 8 so as to convert direct current into rapidly successive pulses of welding current by necessarily discharging said condensers into said load could be devised. Also other types of discharge tubes or circuit-connecting means may be utilized instead of those shown herein. Various other ideas as to the utilization of the principles enunciated and claimed herein will suggest themselves to those skilled in the art. It is accordingly desired that the appended claims be given a broad interpretation commensurate with the scope of the invention within the art.

What is claimed is:

1. A welding system comprising a source of direct current, a stabilizing condenser connected across said source, said stabilizing condenser being sufficiently large to maintain substantially constant voltage across it during operation, an additional condenser, a welding load circuit, means for charging said condenser from said source through said welding load circuit to produce a surge of welding current, and means to discharge said condenser through said welding load circuit to produce a subsequent surge of welding current.

2. A welding system comprising a source of direct current, a stabilizing condenser connected in series with an inductance across said source, said stabilizing condenser being sufficiently large to maintain substantially constant voltage across it during operation, an additional condenser, a welding load circuit, means for charging said condenser from said source through said welding load circuit to produce a surge of welding current, and means to discharge said condenser through said welding load circuit to produce a subsequent surge of welding current.

3. A welding system comprising a pair of condensers, a source of energy for charging said condensers, a common welding load circuit, and means for discharging one of said condensers into said load circuit and simultaneously charging the other of said condensers through said load circuit to perform a welding operation.

4. A welding system comprising a condenser, a welding load circuit including inductance, means for charging said condenser through said welding load circuit to produce a surge of welding current, means for discharging said condenser through said welding load circuit to produce a subsequent surge of welding current, the constants of said system being so related as to tend to make said charges and discharges oscillatory, and means for preventing reversal of current flow during said charging and discharging.

5. A welding system comprising a condenser, a welding load circuit having welding electrodes and inductance, means for charging said condenser through said welding load circuit to produce a surge of welding current, means for discharging said condenser through said welding load circuit to produce a subsequent surge of welding current, the constants of said system being so related as to tend to make said charges and discharges oscillatory, and means for preventing reversal of current flow during said charging and discharging.

6. A welding system comprising a pair of condensers, a source of energy for charging said condensers, a welding load circuit, and means for discharging one of said condensers into said load circuit and simultaneously charging the other of said condensers through said load circuit to perform a welding operation, and charging the first said condenser through said load circuit and simultaneously discharging the other said condenser into said load circuit to perform a subsequent welding operation.

7. A welding system comprising a source of direct current, a pair of condensers connected in series across said source, a common welding load circuit, and means for alternately discharging said condensers into said load circuit while said condensers are so connected.

8. A welding system comprising a source of direct current, a pair of condensers connected in series across said source, a common welding load circuit having one side thereof connected to a point intermediate said condensers and having the other side adapted to be selectively connected to the other side of either of said condensers by a pair of circuit-controlling means, and means for alternately operating said circuit-controlling means for alternately discharging said condensers into said load circuit while said condensers are connected in series across said source of direct current.

9. A welding system comprising a source of direct current, a pair of condensers connected in series across said source, a common welding load circuit having one side thereof connected to a point intermediate said condensers and having the other side adapted to be selectively connected to the other side of either of said condensers by pair of controlled ignition tubes, and means for alternately igniting said tubes for alternately discharging said condensers into said load circuit while said condensers are connected in series across said source of direct current.

10. A welding system comprising a source of direct current, a pair of condensers connected in series across said source, a common welding load circuit having one side thereof connected to a point intermediate said condensers and having the other side adapted to be selectively connected to the other side of either of said condensers by a pair of circuit-controlling means, and means for alternately operating said circuit-controlling means for alternately discharging said condensers into said load circuit by a current pulse while said condensers are connected in series across said source of direct current, the constants of said condensers as related to their discharge circuits being such as to render the duration of each of said current pulses shorter than the time interval between successive welding operations.

11. A welding system comprising a source of direct current, a pair of condensers connected in series across said source, a common welding load circuit having one side thereof connected to a point intermediate said condensers and having the other side adapted to be selectively connected to the other side of either of said condensers by a pair of circuit-controlling means, and means for alternately operating said circuit-controlling means for alternately discharging said condensers into said load circuit by a current pulse while said condensers are connected in series across said source of direct current, the constants of said condensers as related to their discharge circuits being such as to render the duration of each of said current pulses shorter than the time interval between successive welding operations at the maximum welding speed for which said system is designed.

12. A welding system comprising a pair of condensers, means for charging said condensers, a welding load circuit having welding electrodes including a rotatable welding electrode for performing a plurality of successive welding operations during its rotation, and means for alternately discharging said condensers into said load circuit, said last-named means being mounted on the same shaft as said rotatable welding electrode, whereby each welding operation accomplished by said current pulses occurs at a predetermined angular position of said rotatable electrode.

HANS KLEMPERER.